Oct. 30, 1956  W. I. LINLOR ET AL  2,769,094
TIME-OF-FLIGHT NEUTRON SPECTROMETER
Filed Dec. 7, 1954
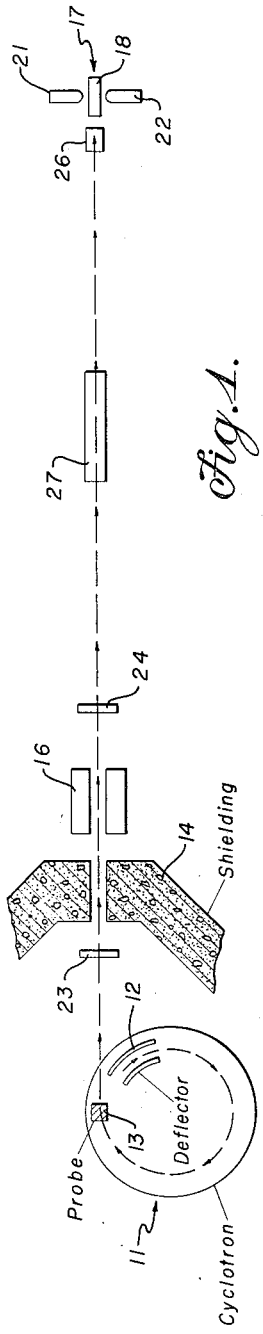
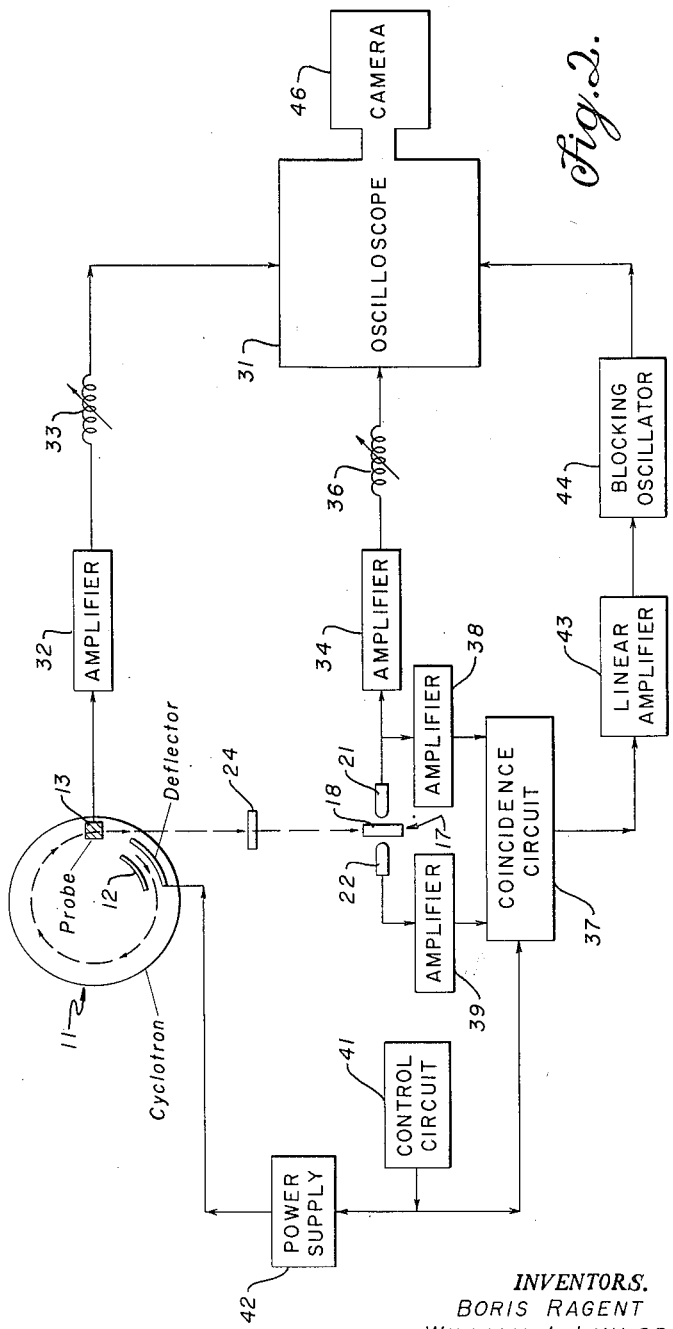
INVENTORS.
BORIS RAGENT
WILLIAM I. LINLOR
BY Roland A. Anderson
ATTORNEY.

United States Patent Office 2,769,094
Patented Oct. 30, 1956

2,769,094

TIME-OF-FLIGHT NEUTRON SPECTROMETER

William I. Linlor, Richmond, and Boris Ragent, Concord, Calif., assignors to the United States of America as represented by the United States Atomic Energy Commission Application December 7, 1954, Serial No. 473,767

6 Claims. (Cl. 250—41.9)

The present invention relates to an improved neutron spectrometer adapted to identify neutron quantity and energy by precise time-of-flight measurements.

In the measurement of nuclear properties of elements it is necessary to produce, detect, and identify neutrons of varying energies and intensities. Various other problems in the field of nuclear physics also require similar neutron information with these problems lying both in the fields of nuclear research and applied nuclear physics. The device of the present invention is adapted for use with means for producing a beam or the like of charged particles preferably in distinct and separate bunches and includes a probe disposed for bombardment by said particles. Located at a precise distance from the probe is a counting mechanism producing electrical signals that are compared in time to electrical signals produced at the probe by the neutron generator thereat whereby neutron energy and intensity is measured.

It is an object of the present invention to provide an improved neutron spectrometer.

It is another object of the present invention to provide neutron measuring means having a spaced probe and counter for producing electrical signals and means for comparing said signals in time.

It is a further object of the present invention to provide a neutron time-of-flight spectrometer comprising a probe adapted for bombardment with charged particles to produce neutrons and simultaneous electrical signals, detection means spaced from said probe for intercepting neutrons produced thereat and producing electrical signals therefrom, and electronic means comparing in time the probe and detector signals as a measure of neutron energy.

Numerous other possible objects and advantages of the present invention will become apparent to those skilled in the art from the following description of a preferred embodiment thereof taken together with the accompanying drawing, wherein:

Figure 1 is a schematic representation of the physical elements of the invention; and Figure 2 is an electrical block diagram of the invention.

Considering now the details of the illustrated embodiments of the invention and referring first to Figure 1 of the drawing, there will be seen to be provided a source of high energy particles, in this case a cyclotron 11. Any suitable means may be employed to produce a beam of high energy particles and the cyclotron herein illustrated operates in a conventional manner by ionizing a gas to produce positive ions, such as deuterons, and to accelerate same in spiral orbits outwardly from the center of the cyclotron. Discrete bunches of charged particles are removed from the cyclotron by a deflector 12 disposed therein adjacent the outer circumference thereof and operate to electrostatically deflect ions radially outward from their normal path. Disposed within the cyclotron proper and froming a part of the spectrometer of the present invention is a probe 13 mounted in position to intercept the deflected beam of charged particles. This probe is formed of copper or the like which upon bombardment by the cyclotron beam produces copious quantities of neutrons and the probe is suitably insulated and shielded.

There emerges from the probe 13 a quantity of neutrons generally comprising a beam and these neutrons are allowed to travel in space, with an aperture being provided in the cyclotron shield 14 through which the neutrons may pass. In order to produce a sharply defined neutron beam, a collimator 16 is disposed in the beam path, with this collimator being formed of a material such as lead and having a restricted opening therethrough for the passage of neutrons. The collimator 16 is made sufficiently massive in the direction of neutron travel to stop all neutrons except those passing through the aperture therein, so that the emergent neutron beam has the same cross section as the collimating aperture. There is disposed at a known distance from the probe in the path of the neutron beam neutron detecting means 17 including a scintillator 18 wherein incident neutrons produce light scintillations. Disposed laterally on opposite sides of scintillator 18 are a pair of photomultiplier tubes 21 and 22 in light tight relation thereto for producing coincident electrical signals from each light pulse within the scintillator. Various well-known scintillation crystals may be employed to produce the light pulses from incident neutrons. Numerous different objects may be disposed in the path of the neutron beam between the probe 13 and the detecting means 17 to effectuate the purposes of various neutron experiments or reactions and there is illustrated in this respect an attenuator 23 disposed directly adjacent the probe 13 in the neutron path and formed for example of lead having a substantial thickness longitudinally of the beam path for reducing the beam intensity and/or energy. Additionally there may be provided one or more scatterers 24 disposed at desired points along the main path to produce desired neutron patterns and an absorber 26 may be placed immediately in front of the detecting means 17 to remove from the beam extraneous charged particles that might otherwise actuate the scintillator 18. For the purpose of calibrating the detecting means, a steel shaft or billet 27 having a sufficient mass to entirely stop the neutron beam may be removably disposed in the beam path whereby background or noise level of the detecting means may be determined.

In addition to the physical elements of the invention above described, there is additionally included as an integral portion of the invention electrical circuitry adapted to accept electrical signals and to produce intelligible information therefrom as regards the neutron beam under observation. Referring to Figure 2 wherein a suitable electrical circuit is illustrated, there will be seen to be provided an oscilloscope 31 upon which is impressed electrical signals from the probe 13 and detecting means 17. As is noted above, bombardment of the probe 13 by charged particles to produce neutrons causes an electrical signal to be produced with each free neutron generated within the probe and these signals are applied through an amplifier 32 and variable time delay means 33 to one of the deflecting circuits of the oscilloscope 31. The other deflection circuit of the oscilloscope is energized by a signal produced at one or both photomultiplier tubes 21 and 22 of the detecting means 17, with an amplifier 34 and variable time delay means 36 connecting the photomultiplier tube and oscilloscope. Additional circuitry associated with the detecting means 17 includes a triple coincidence circuit 37 having separate inputs from the two photomultiplier tubes 21 and 22 through amplifiers 38 and 39, respectively. The third input signal to the coincidence circuit 37 is obtained from a control circuit 41 that is connected to actuate a deflector power supply 42, the signal therefrom having sufficient duration to encompass neutron time-of-flight to the counter. The control circuit 41 operates to apply voltage pulses to the cyclotron deflector 12 whereby the cyclotron beam is deflected to impinge upon the probe 13 and thus by applying this control circuit voltage to the coincidence circuit 37 there can only occur a coincidence circuit output under the condition that the detector signals are produced by a neutron from the probe 13. The coincidence circuit 37 produces an output signal in response to the triple coincidence of output signals from the two photomultiplier tubes 21 and 22 and a control circuit signal, and the coincidence signal is applied through a linear amplifier 43 to control a blocking oscillator 44 that is in turn connected to and controls the sweep circuit of the oscilloscope 31. A camera 46 may be mounted adjacent the screen of the oscilloscope 31 and adapted to take successive high speed pictures of the trace appearing on the oscilloscope screen for the purpose of permanently recording same.

With regard to the operation of the present invention, a beam of charged particles is formed and spirally accelerated in the cyclotron 11 in a conventional manner. As the beam spirals outwardly in the cyclotron, it passes through the plates of the deflector 12. A signal from the control circuit 41 actuates the power supply 42 to apply a pulsed voltage between the plates thereof for electrostatically deflecting a small segment of the cyclotron beam radially outward in the cyclotron, whereupon this deflected beam portion impinges the probe 13 disposed in the deflected beam path. As high energy charged particles strike the probe 13, reactions or events occur wherein neutrons are freed and with the generation of each free neutron there is produced electrical energy. As the probe is insulated this electrical energy is available as a start signal for the neutrons and the signal is amplified in the amplifier 32 and after suitable delay is applied to a deflection circuit of the oscilloscope 31. The neutrons freed in the probe continue in part toward the detector 17 and after passing through a scatterer 24 strike the scintillator 18, wherein light pulses are produced by each incident neutron. A very small scintillation crystal 18 may be employed to reduce the possibility of jamming the circuits as only a limited number of neutrons are thereby detected per unit time. The light pulse at the scintillator 18 from an incident neutron actuates the photomultiplier tubes 21 and 22, which in turn produce electrical signals therefrom and one or both of these signals is amplified and following suitable delay is applied to a deflecting circuit of the oscilloscope. It will thus be seen that two deflecting signals are applied to the oscilloscope, one from the neutron start and one from its interception after a known distance of travel. Clearly, the time separation of signals from the probe and detector is proportional to the neutron velocity or energy between these elements and this time separation is readily calibrated on the oscilloscope to determine the actual neutron energy. The probe signal is preferably inverted in the amplifier 32 so that opposite deflections from the probe and detector result at the oscilloscope, thereby facilitating identification of the respective signals. The time delays for probe and detector signals are known so as to be available in correcting the observed time differential on the oscilloscope and are provided for the purpose of ready adjustment of the position of the oscilloscope trace signals.

There is thus produced at the oscilloscope and upon the screen thereof a trace defining a pair of opposing separated signals with the separation thereof, as corrected by the time delay of each of the signals, comprising a measure of neutron energy. The oscilloscope screen is photographed by the camera 46 operating to repeatedly expose successive film frames and a standard frequency signal may be placed on the oscilloscope deflecting plates periodically for photographing to provide a ready time calibration upon the film.

An additional feature of the invention is the means provided for rejecting spurious signals that might otherwise reach the oscilloscope and complicate the trace on the screen thereof. Thus the photomultiplier tube output signals are each applied to a triple coincidence circuit 37 as is the control signal for the cyclotron deflector, and an output signal from this circuit 37 results only from a coincidence of all three input signals. The control signal from control circuit 41 actuates the deflector 12 to direct particles upon the probe 13 and it is only directly following this control signal that neutrons produced by the cyclotron beam can bombard the detector. The coincidence circuit 37 operates to control a blocking oscillator 44 which has its output connected to the intensity control circuit of the oscillator 31 whereby no visible trace is produced until or unless the coincidence circuit is actuated by coincident input signals. The delay means 33 and 36 provide for application of the probe and detector signals at the oscilloscope later in time than the coincidence signal providing for the trace.

Innumerable different uses may be made of the neutron spectrometer of the present invention, as for example the determination of certain probe properties or of the neutron cross section of scatterers. By disposing the neutron detector at a known distance from the probe, wherein the neutron "beam" originates, and by measuring and recording the time it takes neutrons to travel this distance, the neutron energy is found, and note in this respect gamma rays produced at the probe and reaching the detector may be employed for calibration purposes.

What is claimed is:

1. A neutron spectrometer comprising a probe adapted for disposition in the path of charged particles for producing neutrons therefrom and simultaneous electrical signals from the incident beam of charged particles, a neutron detector disposed at a known distance from said probe for intercepting neutrons therefrom and producing signals from incident neutrons, and comparison means connected to receive signals from said probe and detector and indicating time differential therebetween as a measure of the energy of neutrons traveling from said probe to said detector.

2. A neutron spectrometer comprising a metal probe, means directing bunches of charged particles upon said probe whereby neutrons are freed therein with accompanying electrical signals and said neutrons travel therefrom, neutron detection means disposed at a known distance from said probe in the path of neutrons therefrom and producing an electrical signal from each impinging neutron, an oscilloscope having a screen with a trace periodically traversing same and having deflection means, and means connecting said probe and said detection means to the deflection means of said oscilloscope for producing visual signal indicia thereon whereby separation of said indicia is a measure of neutron velocity between probe and detector.

3. A neutron detector as claimed in claim 2 further defined by a coincidence circuit having the input thereof connected to said detecting means and to the means directing bunches of charged particles upon said probe, said coincidence circuit producing an output signal in response to coincident input signals and being connected to said oscilloscope for actuating the trace thereof in response to coincident input signals.

4. A neutron spectrometer comprising means producing a beam of high energy charged particles, a metal probe, control means directing spaced bunches of charged particles in said beam upon said probe whereby neutrons are freed therein to emanate therefrom and an electrical signal is produced by each neutron event, neutron detecting means disposed at a known distance from said probe for intercepting neutrons therefrom and producing an electrical signal for each impinging neutron, an oscilloscope including a screen upon which an electron beam is adapted to establish a periodic trace and having deflecting means and intensity control means for said beam, and variable delay means connecting said probe and said neutron detecting means to the beam deflection means of said oscilloscope whereby said oscilloscope trace has spaced deflections with the spacing thereof proportional to the neutron time of flight between probe and counter.

5. A neutron spectrometer as claimed in claim 4 further defined by a coincidence circuit connected to said neutron detecting means and to the means directing bunches of charged particles upon said probe whereby coincident signals from each actuate said coincidence circuit to produce an output therefrom, and means connecting said coincidence circuit and the intensity control means of said oscilloscope whereby said oscilloscope trace appears only following coincident probe and detector bombardment.

6. A time-of-flight neutron spectrometer comprising means producing a beam of charged particles, a metal probe adapted for bombardment by charged particles whereby resulting neutron events free neutrons to travel therefrom and produce voltage pulses coincident therewith, deflection means adapted for pulsed energization to periodically direct said beam of charged particles upon said probe whereby periodic bunches of neutrons are formed thereat, control means applying periodic energization to said deflection means, a neutron detector including a scintillator and a pair of photomultiplier tubes producing voltage pulses for each scintillation activation and disposed a known distance from said probe for intercepting neutrons therefrom and producing voltage pulses thereby, a test material removably disposed between said probe and detector, an oscilloscope having a screen with an electron beam sweeping same to form a trace thereon, said oscilloscope having beam deflecting means and beam intensity control means, variable time delay means connecting said probe and said neutron detector to the beam deflecting means of said oscilloscope whereby the space between trace deflections on the screen thereof is related to neutron time of flight between probe and detector, a coincidence circuit connected to the output of said neutron detector and to said deflector control circuit for producing a signal in response to coincident signals therefrom, and a blanking circuit connected to the output of said coincidence circuit and to the intensity control means of said oscilloscope for intensifying said oscilloscope beam and trace upon substantially coincident deflector energization and neutron detection.

References Cited in the file of this patent

The Operation of a Thermal Neutron Time-of-Flight Spectrometer by Egelstaff, published in Journal of Nuclear Energy 1954, volume 1, pp. 57–75; Pergamon Press Ltd., London.